United States Patent Office 3,176,019
Patented Mar. 30, 1965

3,176,019
SUBSTITUTED AMINOBUTYNYL ACETATES
Kenneth N. Campbell and Robert F. Majewski, Evansville, Ind., assignors to Mead Johnson & Company, Evansville, Ind., a corporation of Indiana
No Drawing. Filed June 20, 1961, Ser. No. 118,261
7 Claims. (Cl. 260—293.4)

This invention relates to new aminoacetylenes and more particularly to ester derivatives of 4-amino-2-butynol having the formula

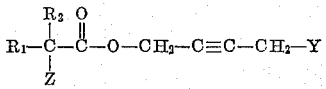

wherein $R_1$ is selected from the group of phenyl, benzyl, cyclohexyl and α-thienyl; $R_2$ is selected from the group consisting of phenyl and benzyl; Z is selected from the group consisting of hydrogen, hydroxyl, methoxy, ethoxy and methylthio; and Y is an amino radical selected from the group consisting of dialkylamino of the formula

wherein $R_3$ and $R_4$ are lower alkyl radicals containing up to 3 carbon atoms, 1-piperidino, 1-pyrrolidino, and 1-morpholino; and the therapeutically acceptable nontoxic acid addition salts of said compounds. The lower alkyl radicals $R_3$ and $R_4$ are methyl or ethyl in the preferred form.

The compounds of the present invention have utility as antispasmodics and local anesthetics. The dosage for mammals is from 0.025 to 5.0 milligrams per kilogram of body weight in the case of administration for the relief of muscle spasms. The compounds may be administered orally in the form of elixirs, tablets, powders, suspensions or the like, or may be administered intravenously. When used as local anesthetics the compounds are preferably administered topically or by infiltration of the tissue at concentrations of 0.25% to 2.0%.

The compounds of this invention may be prepared by a variety of procedures which are described below.

METHOD A

This method comprises a modified Mannich reaction of an acetylene with an aldehyde and an amine. The reaction proceeds as follows:

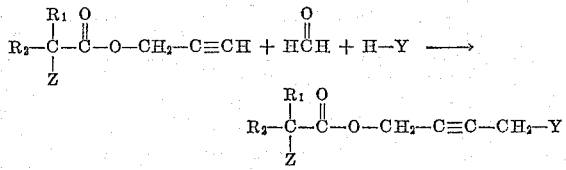

wherein $R_1$, $R_2$ and Z are as previously defined and Y is an amino radical, such as

wherein $R_3$ and $R_4$ are lower alkyl or a heterocyclic radical, such as pyrrolidino

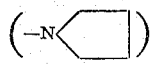

piperidino

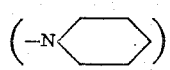

or morpholino

The following example illustrates the preparation of these compounds by Method A.

Example I

*4-dimethylamino-2-butynyl diphenylacetate hydrochloride.*—Paraformaldehyde, 1.56 g. (0.052 mole), and 2.0 g. (0.044 mole) of dimethylamine were dissolved in 10 ml. of dry dioxane and allowed to stand at room temperature for ten minutes. A solution of propargyl diphenylacetate, 10 g. (0.04 mole) dissolved in 25 ml. of dry dioxane, was then added to the reaction mixture and the mixture was heated on a steam bath for seventeen hours under an atmosphere of nitrogen. The reaction mixture was allowed to cool slightly, and the unreacted dimethylamine was removed by evaporation under reduced pressure. Hydrochloric acid (2 N) was then added to the mixture, and the resultant acidic solution was washed with ether. The acidic solution was cooled with crushed ice and basified with 10% sodium hydroxide solution. The insoluble oil which precipitated was taken up in ether and the ether solution was dried over magnesium sulfate. The drying agent was filtered off and dry hydrochloric acid was passed into the solution to precipitate the hydrochloride salt; M.P. 180–181.5° C. (dec.) from n-propanol.

Example II

*4-pyrrolidino-2-butynyl diphenylacetate hydrochloride.*—This compound was prepared by the procedure of Example I, using however pyrrolidine for the dimethylamine (in the same molar proportion). The reactants were heated on the steam bath for 40 hours. The hydrochloride salt of the product crystallized from ethylacetate-propanol melted at 140–142° C.

METHOD B

This method comprises the esterification by the reaction of acid chlorides and 4-substituted-amino-2-butynols according to the following equation:

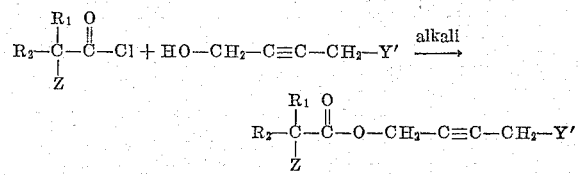

wherein $R_1$, $R_2$ and Z are as previously defined, and Y' is preferably a heterocyclic selected from the group of pyrrolidino, piperidino and morpholino. The following examples illustrate the preparation of these products by Method B.

Example III

*4-piperidino-2-butynyl diphenylacetate hydrochloride.*—Fifteen grams (0.065 mole) of diphenylacetylchloride was slowly added to 10.0 g. (0.065 mole) of 4-piperidino-2-butynol [prepared by the reaction of 1-chloro-4-hydroxy-2-butyne and piperidine (B.P. 116° C., 1.4 mm. Hg (abs.); $n_D^{20}$ 1.5094)], dissolved in 30 ml. of dry pyridine. An exothermic reaction followed and subsided after five to ten minutes. The reaction mixture was then heated on a steam bath for one hour, cooled and poured onto crushed ice and water. The resultant aqueous solution was extracted with two 50 ml. portions of ether and the extracts were combined and washed with several 10-ml. portions of 2 N hydrochloric acid until most of the residual pyridine was removed. The ether solution was washed with water and dried over magnesium sulfate. The drying agent was filtered off and dry hydrochloric acid was passed into the ether solution to form the hydrochloride salt of the expected product. The hydrochloride salt was washed with dry ether and recrystallized from ethyl acetate; M.P. 155–156.50° C.

Example IV

*4-pyrrolidino-2-butynyl benzilate hydrochloride.*—α-chlorodiphenylacetylchloride, 17.2 g. (0.065 mole) was dissolved in about 40 ml. of dry pyridine and 7.0 g. (0.065 mole) of 4-pyrrolidino-2-butynol [prepared by the reaction of 1-chloro-4-hydroxy-2-butyne and pyrrolidine (B.P. 98–104° C., 1.0 mm. Hg (abs.); $n_D^{20}$ 1.5055)] was slowly added to the solution with stirring. When the ensuing vigorous reaction subsided, the mixture was heated on a steam bath for one-half hour.

The reaction mixture was then poured onto crushed ice and water and the resulting aqueous mixture was extracted with ether. The combined ether extracts were washed with water, extracted with 2 N hydrochloric acid, and the acidic extract was heated on a steam bath for five minutes. The mixture was cooled and basified with 10% sodium hydroxide. The viscous oil which separated from the aqueous solution was taken up in ether and the ether was dried over magnesium sulfate. The drying agent was filtered off and the ether was evaporated, leaving a pale yellow solid. Trituration with ether removed the yellow impurity; M.P. 108–111.5° C. from aqueous ethanol.

The free base was partially dissolved in anhydrous ether and dry hydrochloric acid was passed into the solution. The resulting hydrochloride salt was filtered onto a Buchner funnel, washed with ether, dried, and recrystallized from ethyl acetate-ethanol; M.P. 132.5–134.5° C.

Example V

*4-piperidino-2-butynyl diphenyl isobutyrate hydrochloride.*—Diphenylisobutyryl chloride, 18.1 g. (0.07 mole) and 21.0 g. (0.21 mole) of triethylamine were cautiously mixed with 85 ml. of anhydrous benzene. To this stirring mixture, 10.1 g. (0.07 mole) of 4-piperidino-2-butynol, dissolved in 20 ml. of dry benzene was added dropwise. After the addition of the amino alcohol was completed, the reaction mixture was heated on the steam bath for three hours, cooled and poured onto crushed ice and water. The organic layer was separated, washed with water, and extracted with several 5-ml. portions of 2 N hydrochloric acid until the extracts began to contain product (the extracts were made basic to check if product was being extracted). After all excess triethylamine was removed by the method just described, the benzene solution was extracted with 2 N hydrochloric acid. The acidic extracts were combined, cooled in an ice bath, and made strongly basic with 10% sodium hydroxide. An oil separated which was taken up in ether. The ether solution was washed with water and dried over magnesium sulfate. The drying agent was filtered off and dry hydrochloric acid was passed into the ether solution to precipitate the hydrochloride salt of the desired product. The hydrochloride was recrystallized from benzene, M.P. 156.5–158.5° C.

METHOD C

This method of preparing the compounds of the present invention comprises transesterification of a lower alkyl ester of a substituted acetic acid with a substituted aminobutynol or lower aliphatic ester thereof according to the equation:

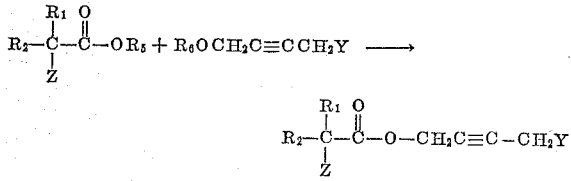

wherein $R_1$, $R_2$, Z and Y are as described above, $R_5$ is a lower alkyl, such as methyl, ethyl, n-propyl, or isopropyl, and $R_6$ is hydrogen, a formyl, acetyl, or propionyl group. The reaction is carried out preferably by heating the two reactants in the presence of a transesterification catalyst, such as sodium or potassium metal, or a lower alkoxide thereof, such as sodium methoxide, sodium ethoxide, or potassium t-butoxide.

The following examples illustrate Method C.

Example VI

*4-pyrrolidino-2-butynyl-α-methylthiodiphenylacetate hydrochloride.*—Methyl-α-methylthiodiphenylacetate, 9.5 g. (0.035 mole) and 4.9 g. (0.035 mole) of 4-pyrrolidino-2-butynol were dissolved in 150 ml. of n-heptane, and about 50 mg. of sodium methoxide catalyst was added. The mixture was stirred and refluxed, and the heptane-methanol azeotrope was collected in a Dean Stark trap. After 0.4 ml. of azeotrope was collected in the trap, the reaction appeared to stop. The reaction mixture was cooled slightly, additional catalyst was added, and refluxing was resumed. The total amount of azeotrope collected was 0.85 ml. (theory, 1.1 ml.).

The reaction mixture was cooled, poured onto ice and water and the organic layer was separated and washed with water. The heptane solution was then extracted with 2 N hydrochloric acid and the acidic extract was washed with ether and then made alkaline with 10% sodium hydroxide. The freed base was then taken up in ether, and the ether solution was washed with water and dried over magnesium sulfate. The drying agent was filtered off and dry hydrochloric acid was passed into the ether solution to precipicate the hydrochloride salt; yield, 5.4 g., M.P. 154–156° C., from isopropyl alcohol.

Example VII

*4-dimethylamino-2-butynyl benzilate hydrochloride.*—This compound was prepared by the method of Example VI from methyl benzilate and 4-dimethylamino-2-butynol [the latter prepared by reaction of 1-chloro-4-hydroxy-2-butyne and dimethylamine; B.P. 80–84° C. (0.55 mm.) $n_D^{20}$ 1.4764] using sodium metal catalyst. The free base product recrystallized from heptane melted at 102.5–105° C. The hydrochloride salt recrystallized from ethylacetate-ethanol melted at 130–133° C.

Example VIII

*4-diethylamino-2-butynyl benzilate hydrochloride.*—This compound was prepared by the method of Example VI, from 4-diethylamino-2-butynol and methyl benzilate, using sodium metal as catalyst for the transesterification reaction. The intermediate was prepared as follows:

To a stirring solution of 41.7 g. (0.57 mole) of diethylamine and 60 ml. of anhydrous benzene was added (within a few minutes) 24.5 g. (0.23 mole) of 1-chloro-4-hydroxy-2-butyne. The ensuing reaction was exothermic causing the reaction mixture to reflux. After the initial reaction subsided, the reaction mixture was refluxed for fifteen minutes and then allowed to cool to room temperature with continual stirring. The solid diethylamine hydrochloride was filtered off and the benzene was removed under reduced pressure. The residual oil was distilled in vacuo; B.P. 85–90° C. (0.45–0.5 mm.); $n_D^{20}$ 1.4793; yield, 25.2 g. (76.5%).

The hydrochloride salt of 4-diethylamino-2-butynyl benzilate, recrystallized from ethylacetate-ethanol, melted at 128.5–130.5° C.

Example IX

*4-piperidino-2-butynyl benzilate hydrochloride.*—This compound was prepared by the method of Example VI using sodium metal as a transesterification catalyst, from the methyl benzilate and 4-piperidino-2-butynol. The free base from heptane melted at 111.5–115° C. The hydrochloride salt recrystallized from ethylacetate-ethanol, melted at 141.5–144° C.

Example X

*4-morpholino-2-butynyl benzilate hydrochloride.*—This compound was prepared by the method of Example VI using sodium metal catalyst from methyl benzilate and 4-morpholino-2-butynol. [The 4-morpholino-2-butynol was prepared by reaction of morpholine and 1-chloro-4-hydroxy-2-butyne, B.P. 119–124° C. (0.9 mm.); $n_D^{20}$ 1.5091.] The free base from ethanol melted at 117.5–120° C. The hydrochloride salt recrystallized from ethylacetate-ethanol melted at 158–160° C.

Example XI

*4-diethylamino-2-butynyl -α- methylthiodiphenylacetate hydrochloride.*—This compound was prepared by the method of Example VI from methyl-α-methylthiodiphenylacetate [Becker et al. Ber. 47, 3149 (1914)], and 4-diethylamino-2-butynol. The hydrochloride recrystallized from ethyl acetate-ethanol, melted at 146–148° C.

Example XII

*4-piperidino-2-butynyl-α-methylthiodiphenylacetate hydrochloride.*—This compound was prepared by the method of Example VI from methyl-α-methylthiodiphenylacetate and 4-piperidino-2-butynol. The hydrochloride salt recrystallized from ethyl acetate: petroleum ether (Skellysolve B, B.P. 63–69° C.), melted at 171.5–173° C. Other salts were nitrate, M.P. 131.5–133.5° C., monohydrogen tartrate, M.P. 120–122.5° C., tartrate, M.P. 99–102° C.

Example XIII

*4-morpholino-2-butynyl - α - methylthiodiphenylacetate hydrochloride.*—This compound was prepared by the procedure of Example VI from methyl-α-methylthiodiphenylacetate and 4-morpholino-2-butynol. The hydrochloride salt recrystallized from ethyl acetate-ethanol melted at 171–173.5° C.

Example XIV

*4-diethylamino-2-butynyl phenyl-α-thienylglycolate hydrochloride.*—This compound was prepared by the method of Example VI from the methyl ester of phenyl-α-thienylglycolic acid [Fischer esterification of the acid (Blicke & Tsao, J. Amer. Chem. Soc., 66, 1645 (1944)) gave the ester; B.P. 130–133° C. (0.65 mm.); $n_D^{20}$ 1.5709], and 4-diethylamino-2-butynol. The hydrochloride salt recrystallized from ether-benzene, pressure bottle, melted at 81.5–83.5° C.

Example XV

*4-diethylamino-2-butynyl phenylcyclohexylglycolate hydrochloride.*—This compound was prepared by the method of Example VI from the methyl ester of phenylcyclohexylglycolic acid [the ethyl ester of phenylcyclohexylglycolic acid—Smith et al. J. Amer. Chem. Soc. 75, 2654 (1953)—was converted to the methyl ester by hydrolysis followed by esterification; B.P. 114–119° C. (0.45 mm.); $n_D^{20}$ 1.5247] and 4-diethylamino-2-butynol. The hydrochloride salt recrystallized from ethylacetate melted at 129–130° C.

Example XVI

*4-piperidino - 2 - butynyl - α - methoxydiphenylacetate hydrochloride.*—This compound was prepared by the method of Example VI using metallic sodium as a catalyst from methyldiphenylmethoxyacetate and 4-piperidino-2-butynol. The hydrochloride salt recrystallized from ethyl acetateethanol melted at 170.5–172° C.

Example XVII

*4-piperidino-2-butynyl-α-ethoxydiphenylacetate hydrochloride.*—This compound was prepared by the procedure of Example VI from methyldiphenylethoxyacetate [prepared by Williamson ether synthesis from equimolar amounts of α-bromo-methyl-benzilate and sodium ethoxide; B.P. 130–137° C. (0.55 mm.), $n_D^{20}$ 1.5454], and 4-piperidino-2-butynol. The hydrochloride salt recrystallized from ethyl acetate-ethanol melted at 173.5–175° C.

Example XVIII

*4-dimethylamino-2-butynyl-α-ethoxydiphenylacetate hydrochloride.*—Equivalent amounts of α-chlorodiphenylacetylchloride, 11.4 g. (0.043 mole), and 4-dimethylamino-2-butynol, 4.9 g., were mixed in a 100 ml. flask and heated with an oil bath at 100–105° C. for twenty-five minutes. Heating was continued at 70° for thirty minutes. The resultant brown viscous oil was washed thoroughly with anhydrous ether and then dissolved in 100 ml. anhydrous ethanol. The ethanolic solution was refluxed for twenty-five hours with 5 g. sodium carbonate. The reaction mixture was cooled, filtered, and made basic with 10% sodium hydroxide. Most of the ethanol was then removed under reduced pressure with the aid of a steam bath and the resultant aqueous mixture was extracted with ether. The ether layers were combined, washed with water and dried over magnesium sulfate. Anhydrous hydrochloric acid was then passed into the ether solution to prepare the hydrochloride salt; yield, 4.0 g. (24%); M.P. 166.5–168.5° C., from ethyl acetate-ethanol.

Example XIX

*4-diethylamino-2-butynyl phenylcyclohexylglycolate hydrochloride.*—A mixture of 394.2 g. of methyl phenylcyclohexylglycolate, 293.1 g. of 4-diethylamino-2-butynyl acetate was dissolved with warming in 2.6 l. of n-heptane. The solution was heated with stirring to a temperature of 60–70° C. and 8.0 g. of sodium methoxide were added. The temperature of the mixture was then raised until the solvent began to distill. Distillation was continued at a gradual rate and aliquots of the distillate were successively collected and analyzed for the presence of methyl acetate by measurement of the refractive index. The reaction was completed when methyl acetate no longer distilled, and the refractive index observed was that of pure heptane ($n_D^{26}$ 1.3855). About three and one-half hours were required for the reaction to be completed. The reaction mixture was then allowed to cool to room temperature, washed with water, and extracted with four 165 ml. portions of 2 N hydrochloric acid. The aqueous extracts were combined and stirred at room temperature to permit crystallization of the hydrochloride salt of the desired product. Crystallization was completed by cooling the slurry in an ice bath, and the product was collected by filtration, pressed dry, and recrystallized from 750 ml. of water. Yield of pure crystalline material, 323 g.

While certain specific acid addition salts were shown in the foregoing examples, it should be understood that other nontoxic pharmacologically acceptable acid addition salts, such as hydrobromides, hydroiodides, sulfates, phosphates, acetates, citrates, succinates, benzoates and the like, can be readily prepared by techniques well known in the art.

A preferred subgenus of the present invention comprises the 4-dialkylamino-2-butynyl benzilates and phenylcyclohexylglycolates, particularly the N-methylated and N-ethylated members disclosed and claimed herein. These substances and their therapeutically acceptable acid addition salts are especially useful as antisecretory and antispasmodic agents having both a direct papaverine-like action and cholinergic blocking action. Such combination of effects has not heretofore been provided in a single agent. These properties are especially pronounced in 4-diethylamino-2-butynyl phenylcyclohexylglycolate and its salts.

This application is a continuation-in-part of our copending application Serial No. 45,292, filed July 26, 1960, now abandoned.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:
1. A compound selected from the group consisting of those of the formula

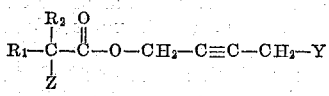

wherein $R_1$ is selected from the group consisting of phenyl, benzyl, cyclohexyl, and α-thienyl; $R_2$ is selected from the group consisting of phenyl and benzyl; Z is selected from the group consisting of hydrogen, hydroxyl, methoxy, ethoxy and methylthio; and Y is selected from the group consisting of lower dialkylamino, piperidino, pyrrolidino and morpholino, and the therapeutically acceptable acid addition salts of said compounds.

2. 4-diethylamino-2-butynyl phenylcyclohexyl glycolate.
3. 4-dimethylamino-2-butynyl-benzilate.
4. 4-diethylamino-2-butynyl-benzilate.
5. 4-piperidino-2-butynyl-α-methylthiodiphenyl-acetate.
6. 4-lower dialkylamino - 2 - butynyl phenylcyclohexyl glycolate.
7. 4-diethylamino-2-butynyl phenylcyclohexylglycolate hydrochloride.

References Cited in the file of this patent
UNITED STATES PATENTS
2,867,619    Biel _____ Jan. 6, 1959